United States Patent [19]

Bridgen

[11] Patent Number: 4,629,896
[45] Date of Patent: Dec. 16, 1986

[54] APPARATUS FOR MONITORING THE INTENSITY OF A UV SOURCE

[75] Inventor: John D. Bridgen, Staines, England

[73] Assignee: Hanovia Limited, Berkshire, England

[21] Appl. No.: 581,073

[22] Filed: Feb. 17, 1984

[30] Foreign Application Priority Data

Feb. 23, 1983 [GB] United Kingdom ............... 8305030

[51] Int. Cl.$^4$ .............................................. G01J 1/42
[52] U.S. Cl. ................................... 250/372; 250/373; 250/455.1
[58] Field of Search ...................... 250/372, 373, 455.1

[56] References Cited

U.S. PATENT DOCUMENTS 3,858,048 12/1974 Shand et al. ...................... 250/372
4,201,916 5/1980 Ellner ................................ 250/372

FOREIGN PATENT DOCUMENTS 522402 6/1940 United Kingdom .
648023 12/1950 United Kingdom .
1199906 7/1970 United Kingdom .
1388351 3/1975 United Kingdom .
1602209 11/1981 United Kingdom .

Primary Examiner—Janice A. Howell
Attorney, Agent, or Firm—Lowe Price LeBlanc Becker & Shur

[57] ABSTRACT

The invention relates to apparatus 1 for monitoring the intensity of a UV source, for example a water sterilizer, in which there is an optical detection unit (2) which detects UV radiation and converts that radiation into an electrical signal which is comparable to the intensity of the UV radiation detected, the optical detection unit (2) being operatively connected with a device including a converter (8) and adapted to indicate the intensity of UV radiation from the source dependent on the electrical signal from the optical detection unit.

7 Claims, 4 Drawing Figures

U.S. Patent Dec. 16, 1986 4,629,896

APPARATUS FOR MONITORING THE INTENSITY OF A UV SOURCE

TECHNICAL FIELD OF INVENTION

The invention relates to apparatus for monitoring the intensity of an ultra-violet or UV source, particularly of the kind which is used for the purification of a liquid such as water.

BACKGROUND ART

UV lamps are often used to purify water. The lamp is usually mounted in a chamber and water flows from an inlet into the chamber, around the lamp, and then out of the chamber through an exit after being sterilized by incident UV radiation emitted by the lamp.

The bacteriocidal effect occurs at certain wavelengths of UV radiation and radiation levels above prescribed power levels. The wavelength requirements are defined by the UV lamp employed, but due to aging the power level changes over a period of time. To ensure safe operation a monitor is required to indicate the power level or intensity of radiation from the lamp.

To achieve an effective bacteriocidal action a very high intensity lamp is used. The transmission of glass is seriously affected over a period of time and the power levels are generally too high for linear operation of normal photo detectors. The system must reduce the intensity of the radiation to practical levels.

The lamps used are generally of the medium pressure kind which although they emit high level radiation, that radiation is not confined to discrete wave-lengths. The radiation usually extends into the visible region. As the aging process of the lamp progresses the UV portion of the spectrum declines more rapidly than the visible portion. The detection system used must therefore respond primarily to the UV portion below 300 nm. Optical filters for this region are very expensive and thus unattractive to use commercially.

DISCLOSURE OF INVENTION

It is accordingly an object of the invention to provide a UV monitor which obviates these disadvantages.

According to the invention there is provided apparatus for monitoring the intensity of a UV source, comprising an optical detection unit which detects UV radiation and converts that radiation into an electrical signal which is comparable to the intensity of UV radiation detected, the optical detection unit being operatively connectible with a device which is adapted to indicate the intensity of UV radiation from the source dependent on the electrical signal from the optical detection unit.

The optical detection unit may comprise aperture means which transmits part of the UV radiation incident on it and emitted by the source, an optical system which collects and receives that part of the UV radiation and directs it along a desired path, and a converter arranged on the path to receive the UV radiation and convert it into an electrical signal which corresponds with the intensity of the UV radiation so that the intensity can be monitored.

The optical system may comprise two reflectors which provide a diverging beam along the path. This arrangement provides a relatively simple yet efficient optical system.

The reflectors may each comprise a polished metal plate, preferably of aluminium. This construction of reflectors provides a relatively robust system which is relatively easily mounted in a body housing the aperture means, optical system and UV detector.

The aperture means may comprise an aperture plate in which the aperture may be circular. Such a construction provides a cone of radiation which is incident on the reflectors. The aperture plate is readily dismountable and replaced by a plate with an aperture of a different size.

The apparatus may include a mounting device which is complementary in shape to a part of a housing in which the UV source, which may be a lamp, is mounted. The apparatus may then be readily mounted via the mounting device adjacent the lamp.

The mounting device may be a circular boss which fits with a push fit over a circular part of a housing for the lamp.

The apparatus may comprise an amplifier which can actuate a meter of the moving coil kind whereby the electrical signal from the detector is amplified to drive the coil so that the meter gives an indication of the intensity of UV light emitted by the lamp.

Apparatus for monitoring the intensity of a UV source in the form of lamp for sterilising water, is hereinafter described, by way of example, with reference to the accompanying drawings.

Figure 1:
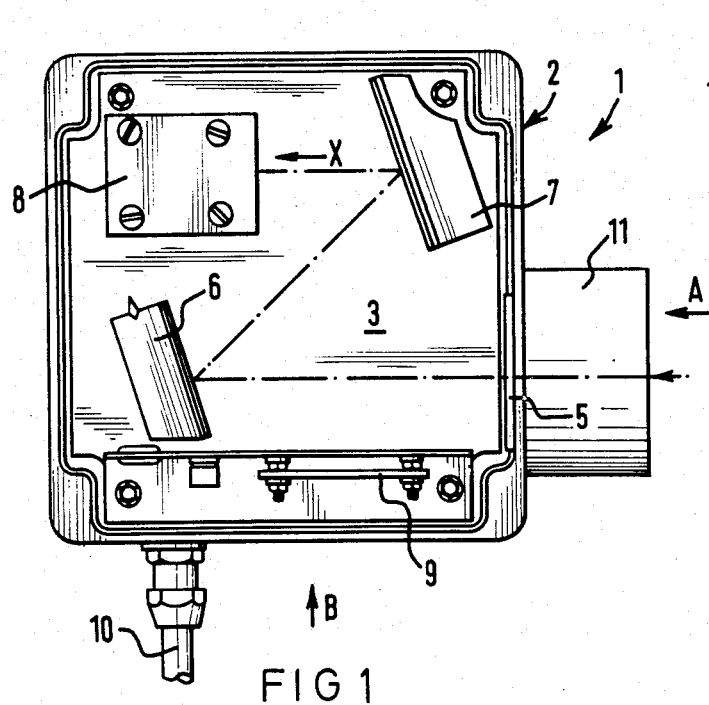
FIG. 1 is a view of the apparatus with a top cover removed, to show the inside.
Figure 2:
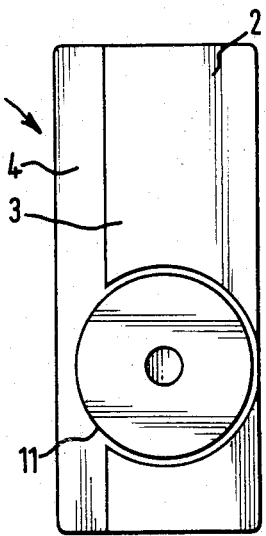
FIG. 2 is a view of the apparatus of FIG. 1 in the direction of the arrow 'A' in FIG. 1, with the cover in place.
Figure 3:
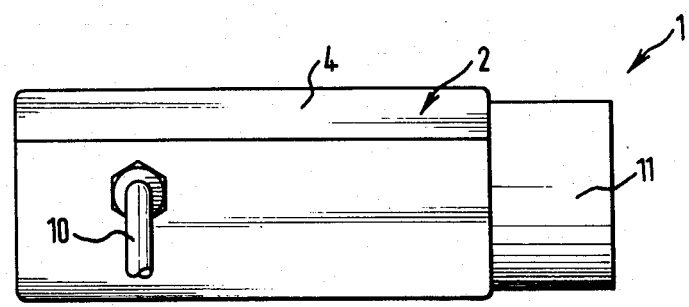
FIG. 3 is a view of the apparatus of FIG. 1 in the direction of the arrow 'B' in FIG. 1, with the cover in place.

Referring firstly to FIGS. 1 to 3, the apparatus 1 shown comprises an optical detection unit 2 which has a body or housing 2 with a removable cover 4 and which includes an aperture plate 5, an optical system in the form of two inclined oblong reflectors 6 and 7 of polished aluminium and a converter in the form of a UV detector 8 which receives the UV radiation incident on it and converts it into an electrical signal of comparable magnitude. This signal is amplified by an amplifier 9 and fed to a control unit (not shown) via an electrical flying lead 10 which has a plug (not shown) for connection with the control unit, which houses a power supply, a moving coil meter and a relay. The moving coil meter gives a direct visual indication of the intensity of the UV radiation monitored by the apparatus 1, and indicates the intensity percentage change taking place with time. The meter is graduated in gradations of 0%–100% and is connected with a threshold control signal which has adjustment means for adjustment of the threshold control point. There is also an adjustment, which is lockable, which is accessible externally of the control unit and which can be used to adjust the sensitivity of UV radiation intensity detection of the apparatus 1.

The apparatus 1 detects radiation and changes therein in the UV spectrum below 300 n.m. generally in the range 250 n.m–300 n.m. which is the range at which it has been found is effective for at least 99.9% killing efficiency of bacteria in water.

To monitor the intensity of UV radiation emitted by a UV lamp in a water steriliser, the optical detection unit 2 with its cover 4 in place and connected to the converter device is placed in position to receive UV radiation from the steriliser, for example by sliding a mounting device 11 in the form of a cylindrical boss adjacent the aperture plate on the cylindrical surround of a viewing port of the steriliser. UV radiation passes from the steriliser, through the viewing port, and impinges on the aperture plate 5, where it is "stopped down" so that only part of the radiation is allowed into the body. That part defines a cone of radiation which is reflected along the path shown in dashed lines in FIG. 1 at 'X' and is reflected by the optical system of reflectors 6 and 7 to the U.V. detector/converter 8. The electrical current generated thereby is amplified and lead to the control unit where the meter responds to show the intensity of the radiation in terms of the killing efficiency. When the meter indicates that a predetermined minimum level has been reached, the lamp has deteriorated to such an extent that it has to be changed for a new one in order to maintain the killing efficiency of the steriliser. Thus the apparatus 1 provides a constant indication that the lamp intensity, and hence water quality, are sufficient to exceed a predetermined minimum radiation dose level.

The apparatus 1 may be adjusted for sensitivity by altering the size or shape of the aperture in the aperture plate, or by adjustment in the position or size of the reflectors 6 and 7, commensurate with their being mountable in the body 2. Also, sensitivity adjustment can be achieved by rotating the body 2, say through 90°, with respect to the lamp being monitored. This rotation also rotates the planes of the reflectors 6 and 7 with respect to the lamp because the reflectors are planar and the U.V. lamp is a line sourced arc.

The apparatus hereinbefore described with reference to the drawings enables a wide range of U.V. sources to be detected accommodated and monitored, at various distances from a particular source being monitored.

Figure 4:
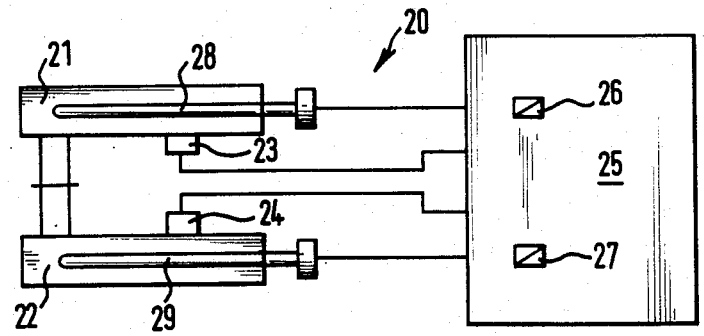
FIG. 4 is a schematic view of a control system for operating a pair of sterilization chambers in series utilizing the apparatus of FIGS. 1 to 3 and to a much smaller scale than those Figs.

Referring to FIG. 4 there is shown schematically therein apparatus 20 embodying the invention used to provide a control system for operation of two water sterilizers 21 and 22 in series. Each sterilizer 21 and 22 has an optical detector 23 or 24 connected to a common control unit 25 which includes visual displays 26 and 27 and automatic switching so that when one lamp 28 in one sterilizer 21 say fails it is automatically shut down and the other lamp 29 in the steriliser 22 is actuated so that water flowing through both sterilizers 21 and 22 is always irradiated to the required level. In addition to the visual indicator that one lamp is "down", there may be audible indication too. Also, though not shown, there may be solenoid operated by the control unit 25, to stop flow of water in case of failure of both lamps, or during shut-down.

I claim:

1. Apparatus for monitoring the intensity of a UV source, comprising:
   (i) an optical detection unit which detects UV radiation and converts that radiation into an electrical signal which is comparable to the intensity of UV radiation detected;
   (ii) a device which is adapted to indicate the intensity of UV radiation from the source dependent on the electrical signal from the optical detection unit;
   (iii) said optical detection unit and said device being operatively connected whereby the intensity of the UV radiation is monitored;
   (iv) said optical detection unit comprising:
      (a) aperture means which transmits part of the UV radiation incident on it and emitted by the source;
      (b) an optical system which collects and receives that part of the UV radiation and directs it along a desired path; and
      (c) a converter arranged on the path to receive the UV radiation and convert it into an electrical signal which corresponds with the intensity of the UV radiation so that the intensity can be monitored; and
   (v) said optical system comprising two metal reflectors which provide a diverging beam along the path.

2. Apparatus as defined in claim 1, wherein said optical system comprises two polished aluminum metal plate reflectors.

3. Apparatus as defined in claim 1, wherein said aperture means comprises a plate and wherein said plate is dismountable and replaceable by a plate with an aperture of a different size.

4. Apparatus as defined in claim 1, wherein there is a mounting device which is complementary in shape to a part of a housing in which the UV source is mounted.

5. Apparatus as defined in claim 4, wherein said mounting device is a circular boss which fits with a push fit over a circular part of the housing for the source.

6. Apparatus as defined in claim 1, wherein there is an amplifier operatively connected to a meter of the moving coil kind whereby the electrical signal from the detector is amplified to drive the coil so that the meter gives an indication of the intensity of UV light emitted by the source.

7. A system for controlling operation of a plurality of water sterilizers wherein water flowing through each sterilizer is sterilized by a UV source comprising: a plurality of apparatus respectively mounted to said sterilizers for monitoring UV intensity with the associated sterilizer, each apparatus including an optical detection unit detecting UV radiation and converting same into an electrical signal which is comparable to the intensity of the UV radiation detected; and a common control and monitoring unit to which each said apparatus is operatively connected, means for connecting said sterilizers in a series flow circuit, said common control and monitoring unit adapted to indicate the intensity of UV radiation of each UV source based upon the electrical signal from each optical detection unit transmitted to said common control and monitoring unit.

* * * * *